United States Patent
Heegard et al.

(10) Patent No.: US 7,113,556 B1
(45) Date of Patent: Sep. 26, 2006

(54) RELIABLE DECISION DIRECTED ADAPTATION IN A COMMUNICATION SYSTEM EMPLOYING FORWARD ERROR CONTROL

(75) Inventors: Chris Heegard, Santa Rosa, CA (US); Stanley K. Ling, Rocklin, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1046 days.

(21) Appl. No.: 09/642,532

(22) Filed: Aug. 18, 2000

(51) Int. Cl.
*H04B 1/10* (2006.01)
(52) U.S. Cl. ...................................... 375/346
(58) Field of Classification Search ................ 375/346, 375/232, 233, 234, 235, 236; 714/781, 785, 714/793, 800, 801
See application file for complete search history.

(56) References Cited

U.S. PATENT DOCUMENTS 3,568,148 A * 3/1971 Clark, Jr. .................. 714/785
4,654,854 A * 3/1987 Heppe ....................... 714/793
5,528,627 A * 6/1996 Yanagi et al. ............... 375/232
6,600,779 B1 * 7/2003 Sawada et al. ............. 375/233
6,621,863 B1 * 9/2003 Ido ............................ 375/232

* cited by examiner

*Primary Examiner*—Khanh Tran
*Assistant Examiner*—Sam K. Ahn
(74) *Attorney, Agent, or Firm*—Steven A. Shaw; W. James Brady; Frederick J. Telecky, Jr.

(57) ABSTRACT

The present invention provides a method and apparatus for selectively updating an adaptive element in a communications receiver based on a determination that the received data is accurate. When inaccurate data is received, the system determines that using that data to update the adaptive element will not be beneficial and excludes the data from being sent to the adaptive element. One mechanism for determining that data has been incorrectly received is the calculation of syndromes as part of a Forward Error Control (FEC) system. Detection of errors through use of the syndrome calculation can be supplemented through windowing to make a determination as to whether a number of received bits should be used or disregarded by the adaptive element. The adaptive element can comprise any number of decision-directed loops including adaptive processors and carrier and timing recovery loops.

32 Claims, 3 Drawing Sheets

RELIABLE DECISION DIRECTED ADAPTATION IN A COMMUNICATION SYSTEM EMPLOYING FORWARD ERROR CONTROL

BACKGROUND OF THE INVENTION

The present invention relates to digital communications, and more particularly to a method and apparatus for providing reliable decision directed adaptation (such as adaptive equalization) in systems that employ Forward Error Control (FEC).

In a digital communications system employing forward error control, the receiver is generally set to correct amplitude, phase and filtering distortions caused by the transmission channel. Such channel phenomena introduce intersymbol interference (ISI), carrier offsets and other effects that must be compensated by the receiver.

A well-known means for correcting channel distortions is to use an equalizer which performs filtering operations to remove the intersymbol interference resulting from the channel. The equalizers that are used for these applications are frequently adaptive in nature, allowing for unknown or time varying changes in the channel characteristics by adapting the equalization to compensate for the channel distortions. An equalization technique that is frequently used in communications systems is the decision-directed adaptive equalization, in which decision estimates are used by the adaptive equalizer. The decisions used by the adaptive equalizer are typically from a hard decision quantizer that does not realize the benefit of coding gain that is achieved through error control. When the pre-decoded Signal-to-Noise Ratio (SNR) is relatively low the decision and decision error values are generally unreliable. For this reason, equalization techniques using decision-directed adaptation have previously had limited success. Another approach to equalization is to use the decision and decision error values obtained from the FEC decoder, since these values are in general more accurate than the values from the quantizer. A difficulty with this approach is that the decoding delay of the FEC decoder interferes with an effective and robust method of adaptation. The introduction of any substantial delay in an adaptation loop renders such methods ineffective.

To compensate for other channel effects such as carrier offsets, a method known as a decision directed phase-locked-loop (PLL) is often employed. Again, the relatively low SNR before the FEC decoder and the delay of the decoded data coming from the output of the decoder lead to problems in updating the carrier tracking method.

For the foregoing reasons, there is a need for a method and apparatus for reliable decision-directed adaptation that takes direct advantage of the error detection of the FEC components of a system. In particular, it would be advantageous to provide such a method and apparatus that directs the updating of an adaptive element using a decision-directed adaptation scheme, and that provides for the reliable updating of the coefficients of the adaptive elements.

SUMMARY OF THE INVENTION

The present invention is directed to a method for use in a digital communication system employing FEC and having a decision directed adaptive element. The invention provides a method and apparatus for selectively updating the adaptive element. It is an object of the present invention to provide, in a digital communication system employing forward error control and having a decision-directed tracking loop having an adaptive element, a method for selectively updating the adaptive element. The method comprises the steps of generating an estimate of a data symbol from an output of the adaptive element, computing an error signal from the estimate of the data symbol and the output of the adaptive element, passing one or more estimates to a decision quality estimator block (DQEB) which computes one or more decision quality indicators (DQI) of estimates and generates a DQI dependent value, and updating the adaptive element with the error signal based on the DQI dependent value.

It is another object of the present invention to provide, in a digital communication system employing forward error control and having a decision-directed tracking loop having an adaptive element, a method for selectively updating the adaptive element. The method comprises the steps of generating an estimate of a data symbol from an output of the adaptive element, computing an error signal from the estimate of the data symbol and the output of the adaptive element, determining if the estimate of the data symbol has one or more probable errors, and selectively disabling updates of the adaptive element with the error signal if a determination has been made that the estimate of the data symbol has a probable error.

It is yet another object of the present invention to provide, in a communication system employing a forward error control code and an adaptive processor, a method for selectively updating the adaptive processor. The method comprises the steps of calculating a DQI of an estimate (wherein the estimate is obtained from an output of an adaptive processor), calculating a signal error from the estimate and the output of the adaptive processor, determining if a sequence of DQIs within a window contains at least one transmission error representative value, and disabling an update of the adaptive processor when a transmission error representative value is present within the window.

It is a further object of the invention to provide an apparatus for selectively updating an adaptive element of a communication system. The apparatus comprises an adaptive element, an estimation circuit for generating an estimate of a symbol from an output of the adaptive element, an error calculating circuit for computing a difference between the output of the adaptive element and the estimate, a transmission error estimation circuit for identifying probable errors in a symbol, and an adaptation controller for controlling the updating of the adaptive element based on the identification of the probable errors in the symbol.

The present invention can be applied to any decision-directed tracking loop having an adaptive element. Such elements can include, for example, adaptive equalizers, timing recovery systems, carrier recovery systems, automatic gain controls and others. The invention allows for data that has a high probability of being erroneous to be excluded from the adaptation process of an adaptive element, thus increasing the ability of the adaptive element to converge on reliable parameters. This allows for more rapid convergence and better system performance, particularly in high noise environments, such as wireless communications and wired communications.

These and other features and objects of the invention will be more fully understood from the following detailed description of the preferred embodiments that should be read in light of the accompanying drawings.

BRIEF DESCRIPTION OF THE DRAWINGS

The accompanying drawings, which are incorporated in and form a part of the specification, illustrate the embodi- In the drawings.

DETAILED DESCRIPTION OF THE PREFERRED EMBODIMENT

Figure 1:
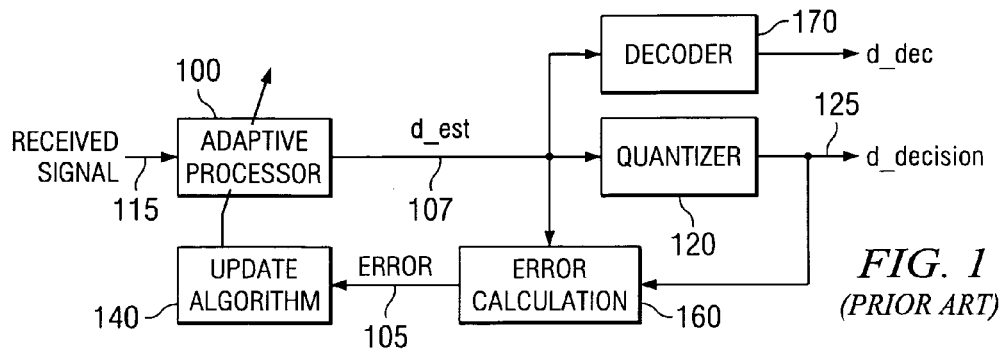
FIG. 1 shows a block diagram of an adaptive processing in the prior art.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 6 in particular, the method and apparatus of the present invention is disclosed.

FIG. 1 is a block diagram of a prior art adaptive processor for use in channels with time-varying or unknown characteristics. The adaptive processor 100 shown in FIG. 1 is based on a baseband model, that assumes that the demodulation is performed prior to the processing. As should be appreciated from the discussion below, the method of the present invention can be applied to either a baseband or passband processing model.

As illustrated in FIG. 1, a received signal 115 is presented to an adaptive processor 100 which can be a linear or a non-linear filter with a transversal or recursive structure, or a phase-locked loop or other adaptive signal processing element. Filter structures and phase-locked loops are well known to those skilled in the art.

The parameters of the adaptive processor 100 are updated to minimize the noise, the intersymbol interference (ISI), the phase noise, or other sources of error at the output. The adaptive processor 100 works in conjunction with an update algorithm 140 to update its parameters.

The update algorithm 140 is driven by an error signal error 105, that indicates to the update algorithm 140 how to update the adaptive parameters to more accurately represent the transmitted data symbol at the output of the adaptive processor 100. The update algorithm 140 can be based on the Zero Forcing (ZF) algorithm, the Least-Mean Squares (LMS) algorithm, the Recursive Least-Squares (RLS) algorithm, or other adaptation algorithms that are well known to those skilled in the art.

As illustrated in FIG. 1, the error signal, error 105, is the output of an Error Calculation 160, that is a function of the quantizer 120 input, represented by d_est 107, and the quantizer 120 output, represented by d_decision 125. A switch and a reference signal generator can be added to the system shown in FIG. 1 to allow for a training sequence to be utilized to train the adaptive processor 100.

The adaptation of the parameters in the steady-state mode, as illustrated in FIG. 1, is decision directed. The quantizer 120 makes a hard decision from the output of the adaptive processor 100 and generates an estimate of the data symbol, d_decision 125, that is equal, in absence of noise and ISI, to the output of the adaptive processor 100, represented here as signal d_est 107. This signal is given to the FEC decoder 170, for error correction processing and final detection of the data.

Figure 2:
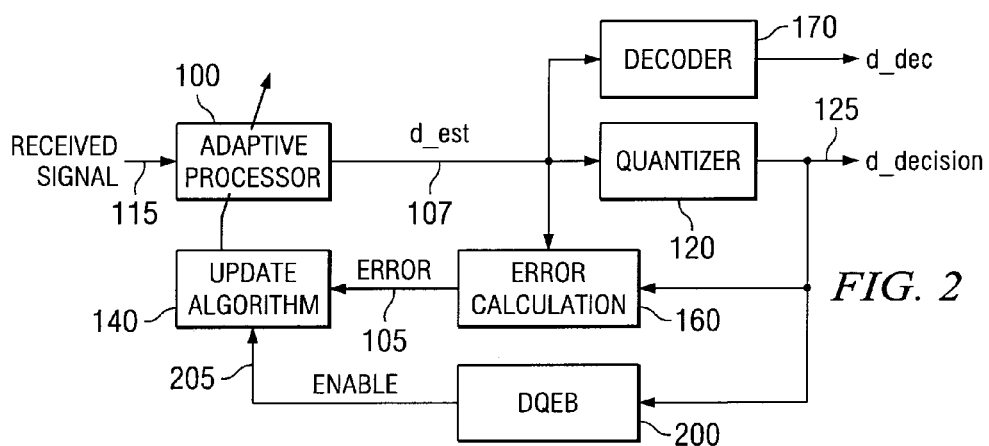
FIG. 2 shows a block diagram of an adaptive processing according to the invention.

FIG. 2 is a block diagram of a representative adaptive processor that can be used as part of the present invention. In this diagram, the received signal 115 is applied to the adaptive processor 100 as also illustrated in FIG. 1

The adaptive processor 100 attempts to mitigate the distortions present in the signal 115, thus permitting accurate detection of the data symbols. In one embodiment of the invention, the detected data symbol, d_est 107, generated by the adaptive processor 100, is applied to the quantizer 120 and to FEC decoder 170.

The estimated decision error signal error 105 is computed, as described in FIG. 1, from d_est 107 and from the estimated data symbol, d_decision 125. The estimated data symbol is also called the decision. The quantizer 120 produces an estimate of the transmitted data symbol, d_decision 125. For low SNRs, d_decision 125 may be frequently in error compared to the transmitted data. In the case of a transmission error both d_decision 125 and error 105 will provide false information to the adaptation algorithm controlling the processor.

In one embodiment of the present invention, the error pattern present within a sequence of decisions is detected by a decision quality estimator block (DQEB) 200 which may be implemented as a syndrome calculator. An enable generator within the DQEB 200 determines if a transmission error representative value is present within a sequence of symbols and also determines how long to disable the adaptation. An implementation of the DQEB 200 as a syndrome calculator will be described with respect to FIG. 6.

As illustrated in FIG. 2, the output of the DQEB 200, represented as enable 205, is used by the update algorithm 140 to determine whether to update the parameters of the adaptive processor 100 or not. This determination may be made by an adaptation controller which may be part of the update algorithm 140 or implemented separately. In accordance with one embodiment of the present invention, the error signal, error 105, is multiplexed with an error value of zero (0). The update of the adaptive processor 100 is enabled when enable 205 is equal to one (1). In this case, the output of the multiplexer (not shown here) is equal to error 105. When the DQEB 200 detects a transmission error within its window, enable 205 disables the adaptation of the adaptive processor 100 by multiplexing an error value of 0 instead of the usual error signal error 105. Alternatively, the error value can be any value that can disable the updating of the adaptive parameters.

In another embodiment of the invention, the error signal, error 105, is used to make tentative updates of the adaptive parameters in the update algorithm 140. The tentative updates are accepted or rejected once the enable signal 205 is provided by the DQEB 200. The update of the adaptive processor 100 is accepted when enable 205 is equal to one. In this case, the adaptive parameters calculated by the update algorithm 140 are supplied to the adaptive processor 100 based on the error 105 samples that are deemed reliable by the DQEB 200. When the DQEB 200 detects a transmission error within its window, enable 205 directs the update algorithm 140 to reject the tentative updates based on the suspect error 105 samples that are deemed unreliable by the DQEB 200.

The system illustrated in FIG. 2 thus allows for discrimination between error signals that are believed to be inaccurate due to reception errors, and error signals that are believed to be an accurate measurement of the received signal. In this embodiment, the FEC decoder 170 decodes the detected data symbols, d_est 107 to recover the transmitted information data. This decision quality-controlled adaptation, although described with respect to an adaptive processor, can be applied to any tracking loop system using decision-directed adaptation and FEC. Some of the tracking loop systems to which the invention can be applied include adaptive equalizers, timing and carrier recovery loops, and automatic gain control systems. Other loops that are adaptive and support the detection and symbol determination process can also benefit from the present invention.

Figure 3:
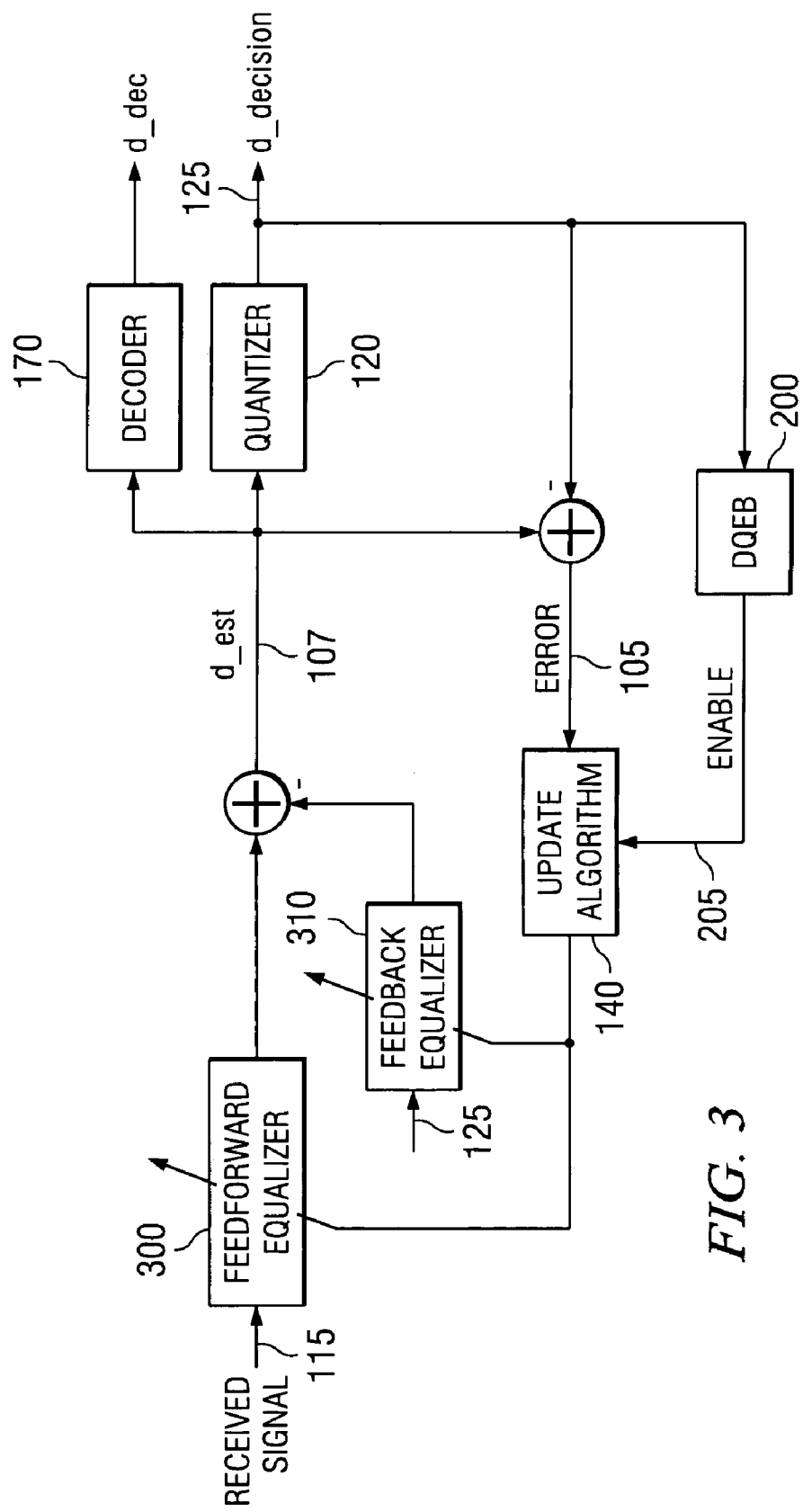
FIG. 3 shows a block diagram of an adaptive decision-feedback equalizer using the invention.

FIG. 3 is a block diagram of a reliable adaptive decision-feedback adaptive equalizer. In this embodiment the received signal 115 is filtered by a feed-forward equalizer 300 (FFE). The output of the FFE 300 produces d_est 107 once the output of the decision-feedback filter 310 (DFF) is subtracted. The DFF 310 is a filter which draws its input from the d_decision 125 signal produced by the quantizer 120. The error 105 is obtained from the difference of d_est 107 and d_decision 125. The error 105 is used to estimate updates for the parameters of the FFE and DFF when the DQEB 200 indicates, via enable 205, that the data is reliable. Decision directed adaptive decision-feedback equalizer methods are well known to those skilled in the art.

The quantizer 120 output is applied to the DQEB 200 in order to detect the presence of error in the d_decision 125. Since the update algorithm uses the error signal between the detected data symbol at the input of the quantizer 120 and the decision at the output of the quantizer 120, the multiplexing method of the present invention described in accordance with FIG. 2 can be applied. The error signal can be multiplexed with a disabling error value that, when passed to the update algorithm, disables the update. Similarly, the tentative update with acceptance or rejection of the result based upon the enable 205 from the DQEB 200 can be applied to the DFE adaptive equalizer illustrated in FIG. 3.

Figure 4:
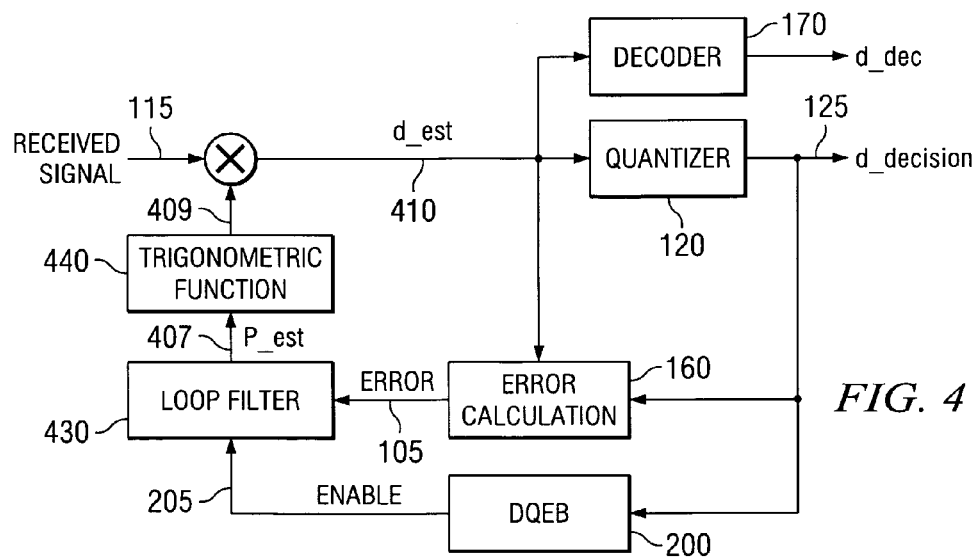
FIG. 4 shows a block diagram of a decision-directed digital phase-locked loop using the invention.

FIG. 4 is a block diagram of a reliable carrier-recovery phase-locked loop. In this embodiment, the received signal 115 is mixed by a carrier signal 409. The output of the mixer produces a data_estimate (d_est) 410 that is quantized to d_decision 125. The error signal 105 is obtained from the data_estimate 410, d_decision 125 and knowledge of the signal constellation. For example, for a QAM constellation, a typical error signal can be Error=real(z)*(imag(z)−real(x))−imag(z)*(real(z)−real(x)) where x=d_decision, z=Data_Estimate, real(x)=the real part of x, and imag(x)=the imaginary part of x. The error 105 is used to estimate updates for the parameters of the loop filter 430 when the DQEB 200 indicates, via enable 205, that the data is reliable. Typical parameters for the loop filter might include the estimated phase offset and frequency offset of the carrier on the received signal 115. The loop filter 430 produces a phase estimate, P_est 407, that is an estimate of the current phase of the carrier. This phase estimate is translated, via trigonometric function 440, into the carrier signal 409 that is mixed with the received signal 115. Such decision directed phase-locked loop methods are well known to those skilled in the art.

The quantizer 120 output is applied to the DQEB 200 in order to detect the presence of error in estimated data symbols d_decision 125. The multiplexing method of the present invention described in accordance with FIG. 2 can be applied. The error signal can be multiplexed with a disabling error value of zero that, when passed to the loop filter 430, disables the update. Similarly, the tentative update with acceptance or rejection of the result based upon the enable 205 from the DQEB 200 can also be applied.

Figure 5:
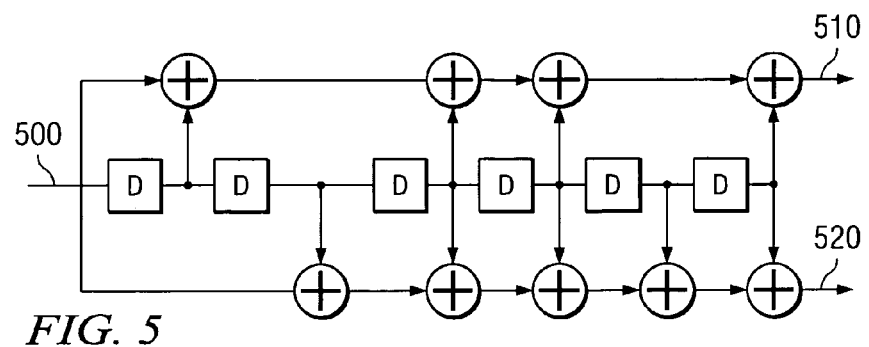
FIG. 5 shows a block diagram of a BCC encoder.

FIG. 5 illustrates an encoder for a 64 state, rate ½ BCC. In this case, the generator matrix G=[133, 175] (given in octal notation)=[$1+D+D^3+D^4+D^6$, $1+D^2+D^3+D^4+D^5+D^6$] results in an encoder with a single binary input 500 and two binary outputs 510, 520. The input 500 is passed through a binary shift register of length 6. The outputs are computed as linear combinations, modulo 2, of the input and the contents of the shift register. The specific linear combination depends on the generator matrix G. (Note: addition modulo 2 is equivalent to the binary XOR operation.) As can be seen in FIG. 5, working from the input at the left to the output at the right, the output of the first, third, fourth and sixth stages ("D") are XOR'd with the input in the upper path, resulting in the term $1+D+D^3+D^4+D^6$. Similarly, the output of the second, third, fourth, fifth and sixth stages are XOR'd with the input in the lower path, resulting in the term $1+D^2+D^3+D^4+D^5+D^6$.

Figure 6:
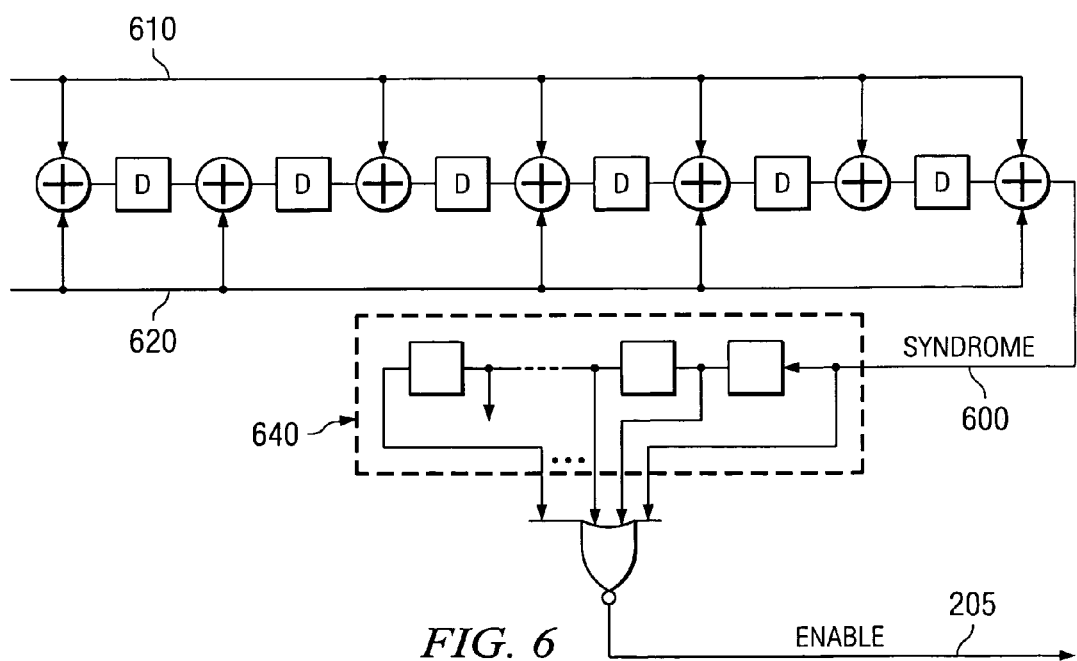
FIG. 6 shows a block diagram of a BCC syndrome calculator and window device.

FIG. 6 illustrates a syndrome calculator for the convolutional code with encoder given in FIG. 5. The parity check matrix for the convolutional code is H=[175, 133]=[$1+D^2+D^3+D^4+D^5+D^6$, $1+D+D^3+D^4+D^6$] as illustrated in FIG. 6. The syndrome calculator consists of two components, a parity check calculator and an enable generator. The parity check calculator has two binary inputs 610, 620 and a binary output syndrome 600. The syndrome 600 is calculated as a linear combination, modulo 2, of the input and the contents of a shift register. The specific linear combination depends on the parity check matrix H. The value of a sequence of syndromes 600 indicates the validity of the input with respect to the BCC. For example, without the presence of errors, if the outputs of the encoder in FIG. 5 are input to the parity check calculator, then the syndrome 600 will be zero. Use of a syndrome calculator to determine the error pattern of a transmission is well known to those skilled in the art.

The results of the parity check calculation are passed through a shift register of length n. In one embodiment, the length of the shift registers can be set as a design parameter that need not be tied to parameters of the forward error control code such as the length of the encoder or parity-check registers. Alternatively, the length of the shift-register can be a function of the parameters of the FEC code. Changing the length of the register trades off the two types of error in binary hypothesis testing problems. A long register will reduce the chance of declaring the data error free when errors do in fact exist in the data. On the other hand, a long register will often reject error free data and limit the frequency of parameter update.

The output of the syndrome calculator, enable 205, is computed by performing a transmission error detection operation that can be an inclusive 'nor' (NOR) logic operation over the content of the window of shift register 640. In this embodiment, when a syndrome value of one is present within the window, the output of the decision device is equal to zero, disabling the adaptation of the update calculator.

Although the syndrome calculator is illustrated for a convolutional code, the present invention can also be applied to systems using block codes or other types of codes such as linear codes and cosets (affine translations) of linear codes. For example, a simple (n=7, k=4) binary Hamming code is described by the generator matrix $$G = \begin{bmatrix} 1 & 0 & 0 & 0 & 1 & 1 & 1 \\ 0 & 1 & 0 & 0 & 0 & 1 & 1 \\ 0 & 0 & 1 & 0 & 1 & 0 & 1 \\ 0 & 0 & 0 & 1 & 1 & 1 & 0 \end{bmatrix}$$

and parity check matrix $$H = \begin{bmatrix} 1 & 0 & 1 & 1 & 1 & 0 & 0 \\ 1 & 1 & 0 & 1 & 0 & 1 & 0 \\ 1 & 1 & 1 & 0 & 0 & 0 & 1 \end{bmatrix}.$$

The codewords are the sixteen length 7 binary vectors that lie in the row space of the generator matrix, c=m*G. A binary vector of length 7 is a codeword of the code if and only if it lies in the null space of the parity check matrix c*H=0. For a given vector x of length 7, the syndrome S=x*H or, in this case S=[S_1 S_2 S_3]
S_1=x_1+x_3+x_4+x_5
S_2=x_1+x_2+x_4+x_6
S_3=x_1+x_2+x_3+x_7 indicates a codeword if and only if S_1=S_2=S_3=0. In one embodiment, the syndrome calculator issues an enable 205 when the syndromes are calculated over the block of seven symbols.

In one embodiment of the present invention, the decision quality indicator-controlled adaptation is applied to adaptive systems using block update with rate r. In systems using rate r block update, the parameters are updated once every r symbols. For example, a system using a QPSK modulation can update the parameters of the processor once every 4 QPSK symbols. In this embodiment, the window length can be set accordingly. For example if the QPSK modulation is preceded by a rate ½ binary convolutional code, a window length of four can be used in the syndrome calculator.

It should now be appreciated that the present invention provides techniques for selectively updating an adaptive element in a communications receiver based on a determination that the received data is accurate. When inaccurate data is received, the system determines that using that data to update the adaptive element will not be beneficial and excludes the data from being sent to the adaptive element. One mechanism for determining that data has been incorrectly received is the calculation of syndromes as part of a forward error correction system. Detection of errors through use of the syndrome calculation can be supplemented through windowing to make a determination as to whether a number of received bits should be used or disregarded by the adaptive element. The adaptive element can comprise any number of decision-directed loops, such as adaptive processors and carrier and timing recovery loops.

Although the invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a digital communication system employing forward error control and having a decision-directed tracking loop with an adaptive element, a method for selectively updating the adaptive element, said method comprising the steps of:
    (a) generating an estimate of a data symbol from an output of the adaptive element;
    (b) computing an error signal from the estimate of the data symbol and the output of the adaptive element;
    (c) computing one or more decision quality indicators of estimates, detecting transmission errors over the one or more decision quality indicators of the estimates in a window, and generating a decision quality indicator dependent value; and
    (d) updating the adaptive element with the error signal based on the decision quality indicator dependent value, wherein the one or more decision quality indicators are syndromes.

2. The method of claim 1, wherein
    the one or more decision quality indicators of estimates are computed using a parity check operation; and
    the transmission errors are detected by a transmission error detection operation over the syndromes contained in the window of shift registers.

3. The method of claim 2 wherein the transmission error detection operation is an inclusive 'NOR' operation.

4. The method of claim 2 wherein the window has a length equal to one.

5. The method described in claim 1 wherein step (d) comprises the further steps of:
    (i) multiplexing the error signal with an adaptation-disabling value; and
    (ii) disabling the updating step when a transmission error is detected.

6. The method of claim 5 wherein the adaptation-disabling value is a zero value.

7. The method described in claim 1 wherein step (d) comprises the further steps of:
    (i) analyzing the decision quality indicator dependent value to determine if the transmission errors have occurred; and
    (ii) rejecting a tentative update if it is determined that the transmission errors have occurred.

8. The method of claim 1, wherein the window has a length that is a function of a forward error control code.

9. In a digital communication system employing forward error control and having a decision-directed tracking loop with an adaptive element, a method for selectively updating the adaptive element, said method comprising the steps of:
    (a) generating an estimate of a data symbol from an output of the adaptive element;
    (b) computing an error signal from the estimate of the data symbol and the output of the adaptive element;
    (c) determining if one or more of the estimates of the data symbol has one or more probable errors within a window of shift registers; and
    (d) selectively disabling updates of the adaptive element with the error signal if a determination has been made that the estimate of the data symbol has a probable error within the window of shift registers.

10. The method of claim 9 wherein the adaptive element performs an equalization function.

11. The method of claim 9 wherein the adaptive element performs a timing recovery function.

12. The method of claim 9 wherein the adaptive element performs a carrier recovery function.

13. The method of claim 9 wherein the adaptive element performs an automatic gain control function.

14. The method of claim 9, wherein the window has a length that is a function of a forward error control code.

15. In a communication system employing a forward error control code and an adaptive processor, a method for selectively updating the adaptive processor, the method comprising the steps of:
(a) calculating a decision quality indicator of an estimate wherein the estimate is obtained from an output of the adaptive processor;
(b) calculating a signal error from the estimate and the output of the adaptive processor;
(c) determining if a sequence of the decision quality indicators within a window contains at least one transmission error representative value; and
(d) disabling an update of the adaptive processor when the at least one transmission error representative value is present within the window.

16. The method of claim 15 further comprising the step of:
(e) enabling the update of the adaptive processor when the sequence of decision quality indicators within the window does not contain the at least one transmission error representative value.

17. The method of claim 15 wherein the forward error control code is a block code and the size of the window of step (c) is set equal to the size of a block of information.

18. The method of claim 15 wherein the forward error control code is a convolutional code and the size of the window of step (c) is set equal to the constraint length of the convolutional code.

19. The method of claim 15 wherein the adaptive processor is based on a block update with a certain rate and wherein the size of the window is set proportional to the block update with the certain rate.

20. The method of claim 15, wherein the size of the window is dependent on a forward error control code.

21. An apparatus for selectively updating an adaptive element of a communication system, the apparatus comprising:
(a) a quantizer for generating an estimate of a symbol from an output of the adaptive element;
(b) an error calculator for computing a difference between the output of the adaptive element and the estimate;
(c) a decision quality estimator for computing one or more decision quality indicators of estimates within a window and generating a decision quality indicator dependent value, wherein the window has a length that is a function of a forward error control code; and
(d) an adaptation controller for controlling the updating of the adaptive element based on the decision quality indicator dependent value.

22. The apparatus of claim 21 wherein the adaptive element is an adaptive equalizer.

23. The apparatus of claim 21 wherein the adaptive element is a carrier recovery circuit.

24. The apparatus of claim 21 wherein the adaptive element is a timing recovery circuit.

25. The apparatus of claim 21 wherein the adaptive element is an automatic gain control circuit.

26. The apparatus of claim 21 wherein the decision quality estimator is a syndrome calculator.

27. The apparatus of claim 26 wherein the syndrome calculator comprises:
(i) a parity check calculator; and
(ii) an enable generator containing a window of shift-registers, the enable generator having an output based on a NOR operation performed over the contents of the window of shift-registers.

28. The apparatus of claim 21 wherein the adaptation controller is configured to multiplex an error signal with an adaptation-disabling value, the adaptation controller having an output based on an output of the decision quality estimator.

29. An apparatus for selectively updating an adaptive element of a communication system, the apparatus comprising:
(a) an estimation circuit for generating an estimate of a symbol from an output of the adaptive element;
(b) an error calculating circuit for computing a difference between the output of the adaptive element and the estimate;
(c) a transmission error estimation circuit for identifying probable errors in a sequence of decision quality indicators within a window, wherein the window has a length that is a function of a forward error control code; and
(d) an adaptation controller for controlling the updating of the adaptive element based on the identification of the probable errors in the sequence of decision quality indicators.

30. The apparatus of claim 29 wherein the adaptive element is an adaptive equalizer.

31. The apparatus of claim 29 wherein the adaptive element is a carrier recovery circuit.

32. The apparatus of claim 29 wherein the adaptive element is an automatic gain control circuit.

* * * * *